United States Patent

Burbidge et al.

[15] 3,668,113
[45] June 6, 1972

[54] HYDROCATALYTIC PROCESS FOR NORMAL PARAFFIN WAX AND SULFUR REMOVAL

[72] Inventors: Bernard Whiting Burbidge, Leatherhead; Ian Montgomery Keen, Harrow; Christopher Ronald Pout, Sunbury, all of England

[73] Assignee: The British Petroleum Company Limited, London, England

[22] Filed: Sept. 22, 1969

[21] Appl. No.: 860,082

[30] Foreign Application Priority Data

Nov. 7, 1968 Great Britain ............... 52,813/68

[52] U.S. Cl. .................................. 208/97, 208/111
[51] Int. Cl. .................................. C10g 37/06
[58] Field of Search ................... 208/58, 97, 211

[56] References Cited

UNITED STATES PATENTS

| | | | |
|---|---|---|---|
| 3,183,179 | 5/1965 | Schuman | 208/97 |
| 3,338,819 | 8/1967 | Wood | 208/97 |
| 3,438,887 | 4/1969 | Morris et al. | 208/87 |
| 3,472,759 | 10/1969 | Masologites et al. | 208/59 |
| 3,493,493 | 2/1970 | Henke et al. | 208/264 |
| 3,511,772 | 5/1970 | Thompson | 208/112 |

*Primary Examiner*—Delbert E. Gantz
*Assistant Examiner*—G. J. Crasanakis
*Attorney*—Morgan, Finnegan, Durham & Pine

[57] ABSTRACT

Hydrocarbon fractions, particularly petroleum fractions of 30–650° C boiling range and containing 0.1 – 3.0 percent wt. sulphur 5–50 percent wt. n-paraffin wax, are reduced in sulphur and n-paraffin wax content by hydrocatalytic treatment at 260°–482° C and 50–3,000 psig, first over a catalyst of a Group VI or VIII hydrogenating component on a mordenite of reduced alkali metal content to remove n-paraffin wax and then over a catalyst of a Group VI or VIII hydrogenating component and a refractory inorganic oxide to remove sulphur. Diesel fuels or fuel oils are separated from the desulfurized product.

Preferred catalysts are Pt on decationized mordenite and CoMo on alumina used respectively in amounts of 10–90 and 90–10 percent vol., preferably 20–60 and 80–40 percent vol. The feedstock must contact the mordenite catalyst first since this is sensitive to $H_2S$ and if gas is recycled from the sulphur removal to the n-paraffin wax removal stage this should be treated to remove $H_2S$.

5 Claims, No Drawings

HYDROCATALYTIC PROCESS FOR NORMAL PARAFFIN WAX AND SULFUR REMOVAL

This invention relates to the hydrocatalytic treatment of hydrocarbon fractions and particularly to the removal of sulphur and n-paraffin wax from such fractions.

Hydrocarbon fractions particularly petroleum fractions are required to have both a low sulphur content and a low pour point for many uses. Processes are known both for sulphur removal and for the removal of n-paraffin wax, which are the main cause of high pour points in petroleum fractions, but carrying out the processes separately is relatively expensive. It has now been found that both steps can be carried out in the same reaction system provided certain precautions are observed.

According to the present invention a hydrocatalytic process for the removal of sulphur and n-paraffin wax from hydrocarbon fractions comprises passing a hydrocarbon fraction containing sulphur compounds and n-paraffin wax together with substantially sulphur-free hydrogen at 260°–482° C and 50 – 3,000 psig first over a catalyst comprising a crystalline mordenite of reduced alkali metal content and a hydrogenating component selected from metals of Group VI and VIII of the Periodic Table to remove n-paraffin wax and then passing the total reaction product also at 260°–482° C and 50 – 3,000 psig over a catalyst comprising a refractory inorganic oxide and a hydrogenating component selected from metals and compounds thereof of Group VI and VIII of the Periodic Table to remove sulphur.

The two catalysts may be in the same reactor e.g. in a downflow reactor the top portion may contain a bed of the n-paraffin wax removal catalyst and the lower portion a bed of the desulphurisation catalyst.

It is important to carry out the process in the sequence stated. The mordenite n-paraffin wax removal catalyst is not sensitive to sulphur compounds present in the feedstock and does not convert these compounds to hydrogen sulphide. It is sensitive however, to hydrogen sulphide produced by the desulphurisation. The feedstock must, therefore, contact the mordenite first and, as stated above, the hydrogen used must be substantially free of sulphur. In the preferred single reactor system, this may be achieved either by using once-through hydrogen or, when recycle of hydrogen is practised, by scrubbing the recycle gases to remove hydrogen sulphide produced by the desulphurisation. Alternatively a two-reactor system may be used with hydrogen being fed once-through in the first n-paraffin removal reactor and hydrogen being recycled in the second sulphur removal reactor. The hydrogen sulphide content of the inlet hydrogen is preferably less than 1,000 ppm by volume and more particularly less than 200 ppm by volume. Suitable methods for removing hydrogen sulphide from recycle gas streams include washing with alkaline materials such as caustic soda, or an amine such as di-isopropylamine or absorbtion on a solid material such as zinc oxide or a molecular sieve.

The ratio of n-paraffin wax removal and sulphur removal catalysts in the system will depend on the relative amounts of the two components in the feedstock and the degree of removal required. It may vary from 10-90% vol of n-paraffin wax removal catalyst and 90–10 percent vol. of sulphur removal catalyst, preferably 20–60 percent of the former and 80–40 percent of the latter.

The preferred temperatures and pressures for both catalysts are 343°-427° C and 250-1,500 psig. Other process conditions, again for both catalysts, may be chosen from:
Overall space velocity 1–20 v/v/hr, preferably 2-8 v/v/hr
Hydrogen treating rate 250–10,000 SCF/B, preferably 2000-8000 SCF/B. The individual space velocities with each catalyst will depend on the relative amounts of each used. With the preferred amounts of 20–60 percent vol. of n-paraffin wax removal catalyst and 80–40 percent vol. of sulphur removal catalyst the individual space velocities may be:
N-paraffin wax removal catalyst 1–40 v/v/hr preferably 2-16 v/v/hr
Sulphur removal catalyst 1–40 v/v/hr preferably 2-16 v/v/hr The feedstocks may be petroleum fractions boiling in the range 30°–650° C i.e., the gasoline, kerosine, gas oil and wax distillate fractions of crude oil. Such fractions are likely to have sulphur contents in the range 0.1 – 3.0 percent wt. and n-paraffin wax contents in the range 5 to 50 percent wt. and these can be reduced by the process of the present invention to levels of 0.01 – 0.3 percent wt. sulphur depending on the sulphur content of the feed and n-paraffin wax contents of 0 to 10 percent wt. again depending on the n-paraffin wax content of the feedstock and the severity of the catalytic treatment. The process is particularly suitable for the production of gas oils of 250° to 400° C ASTM boiling range suitable as diesel fuels or fuel oils.

The n-paraffin wax removal process and catalyst may be broadly as described in U.K. Patent specification Nos. 1,088,933 and 1,134,014. The term "crystalline mordenite of reduced alkali metal content" means, preferably, a mordenite with an alkali metal content of less than 3 percent wt., more particularly less than 1.5 percent wt. The deficiency of alkali metal cations can be made up with other metal cations for example Group II metal cations, particularly magnesium, or rare earth metal cations. Preferably however the mordenite is a "-decationized mordenite," which means a mordenite having a deficiency of metal cations. An alternative term in the art is hydrogen mordenite, since it is assumed that when metal cations are removed they are replaced by hydrogen ions.

Natural or freshly prepared synthetic mordenite has the formula:

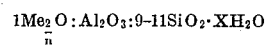

where Me is a metal cation, n is the valency of the cation and X is variable between nil and 7 depending on the thermal history of the sample. In natural mordenite or freshly prepared synthetic mordenite Me is commonly an alkali metal, particularly sodium.

Decationization can be achieved by exchange of the alkali metal cations with ammonium ions followed by heating at e.g., 250°–600° C to drive off the ammonia. With this method of decationization alkali metal contents can be reduced to less than 0.5 percent wt. An alternative method is treatment with an acid to decationize the zeolite directly. Suitable acids are hydrochloric or sulphuric acid. Acid treatment may not remove the alkali metal cations to the same extent as ammonium exchange but this is not necessarily disadvantageous and it is not difficult to reduce the alkali metal content to below 1 percent wt. If the acid treatment uses strong acid of from 5–50 percent wt. strength preferably 10–20 percent wt strength, an additional effect is obtained, in that aluminum is removed from the crystal lattice with a consequent increase in the silica:alumina ratio. For example, the normal silica:alumina ratio of 9–11:1 can be increased to 14:1 or more. FIGS. of as high as 90:1 have been reported, but the preferred range is 14:1 to 50:1. Increase of time, temperature and acid strength increases the aluminum removal and a convenient acid treatment is with 10–20 percent wt. acid under reflux for 2–12 hours.

After either form of decationization the mordenite is desirably washed to remove excess acid or ammonium exchange solution and is heated to 250°–600° C.

It should be emphasized that mordenite with higher than normal silica:alumina ratios retain the crystal structure of mordenite and are not significantly altered in terms of physical strength, stability or crystallinity.

The hydrogenating component is preferably a platinum group metal, particularly platinum or palladium, and it is preferably added by ion-exchange. The amount of the platinum group metal is preferably within the range 0.01 to 10 percent wt., particularly 0.1 to 5 percent wt.

The catalyst is preferably calcined at for example 250°–600° C in dry flowing air before use to remove any water and to eliminate any ligands attached to the hydrogenation component. It may also be reduced in a stream of hydrogen at 250°–600° C.

The n-paraffin wax removed are cracked to lower-boiling n-paraffins, largely $C_3$ and $C_4$ paraffins with possibly some $C_5$–$C_7$ hydrocarbons. These materials may be readily separated from the product by distillation, particularly if the feedstocks are kerosine or higher boiling fractions, and are themselves valuable as LPG and petrochemical feedstocks.

In the sulphur removal catalyst, the refractory inorganic oxide support is preferably an oxide of an element of Groups II, III and IV of the Periodic Table or a mixture of such oxides. The preferred support is alumina. The hydrogenating component is preferably an oxide or sulphide of a Group VIb metal (i.e., tungsten, molybdenum and chromium) together with one or more oxides or sulphides of the iron group metals (i.e., cobalt, nickel and iron). The amounts may be from 2–25 percent wt. of the Group VIb metal, expressed as metal, and 0.1–10 percent of the iron group metal or metals, also expressed as metal. Preferred catalysts contain molybdenum oxide or sulphide together with cobalt and/or nickel oxide or sulphide.

The invention is illustrated by the following examples.

EXAMPLE 1

A heavy gas oil was passed downwards into a reactor containing a dual catalyst bed. The top one-third of the bed was a platinum-hydrogen mordenite catalyst and the bottom two-thirds a cobalt and molybdenum oxides an alumina catalyst. Inspection data on the two catalysts which had been calcined at 550° C were as follows.

| Pt-H-mordenite catalyst | Co-Mo-Al₂O₃ catalyst |
|---|---|
| Pt % wt. 0.46 | Co      % wt. 1.9 |
| Na % wt. 1.45 | Mo      % wt. 10.4 |
| Si % wt. 39.8 | Al₂O₃ % wt. 86.0 |
| Al % wt. 4.58 | Surface Area m²/g 244 |
| SiO₂/Al₂O₃ mole ratio 16.7 | Pore volume ml/g. 0.31 |
| Surface area m²/g 410 | |
| Pore volume ml/g 0.21 | |

Details of the feedstock, the process conditions used and the results obtained are given in Table 1 below.

colorless, redissolved in petroleum ether, transferred to the original flask and weighed after evaporation of the petroleum ether. The wax content is given as percentage b weight on the original oil.

The n-paraffin wax contents were measured by gas-liquid chromatography.

The table shows that appreciable reductions in both sulphur content and n-paraffin wax content were obtained. The figures showing lowered pour points and reduced wax contents for the product also confirm that the n-paraffin wax content has been reduced.

EXAMPLE 2

A gas oil having an ASTM boiling range of 242° to 450° C was passed downwards over a dual catalyst bed using the catalysts of Example 1 but in a ratio of 50 percent vol. Pt-H-mordenite (top half) and 50 percent vol. Co-Mo-alumina (bottom half).

The conditions used and the results obtained are set out in Table 2 below.

TABLE 2

| | | Hours on stream | |
|---|---|---|---|
| | Feed | 0–250 | 260–420 |
| Bed temperatures: | | | |
| Mordenite bed, top, ° C | | 372 | 373 |
| Mordenite bed, mid, ° C | | 399 | 399 |
| Mordenite bed, bottom, ° C | | 401 | 401 |
| Co-Mo alumina bed, top, ° C | | 391 | 394 |
| Co-Mo alumina bed, mid, ° C | | 399 | 399 |
| Co-Mo alumina bed, bottom, ° C | | 410 | 405 |
| Pressure, p.s.i.g | | 1,000 | 1,000 |
| Space velocity (overall), vol./vol. h | | 3.0 | 3.0 |
| Over mordenite, vol./vol. h | | 6.0 | 6.0 |
| Over Co-Mo alumina, vol./vol. h | | 6.0 | 6.0 |
| Once through gas rate, s.c.f./brl | | 5,000 | 3,000 |
| Unstabilized product (H₂S free): | | | |
| Yield on feed, percent wt | 100 | 90.0 | 92.4 |
| Pour point, ° C | +7 | (a) | (b) |
| Sulphur content, percent wt | 1.91 | (c) | (d) | a —23 to —18.   b —15 to —10.   c 0.3 to 0.4.   d 0.4 to 0.5.

Again the products show appreciable reductions in sulphur content and n-paraffin wax content (as demonstrated by the lower pour point). As compared with Example 1, the increased amount of Pt-H-mordenite catalyst relative to the Co-Mo-alumina catalyst has given a greater reduction in pour point. The beneficial effect of a higher gas rate (5,000 as against 3,000 SCF/B) is also shown.

The following comparative example shows the importance of keeping the mordenite catalyst out of contact with H₂S.

TABLE 1

| Hours on stream | 8–96 | 109–213 | 224–272 | 296–352 | 364–444 | 454–558 | 569–585 |
|---|---|---|---|---|---|---|---|
| Feedstock: | | | | | | | |
| Boiling range, ° C. ASTM | 278–345 | | | | 242–450 | | |
| Pour point, ° F | 45 | 45 | 45 | 45 | 45 | 45 | 45 |
| Sulphur content, percent | 1.83 | 1.83 | 1.83 | 1.88 | 1.88 | 1.88 | 1.88 |
| Process conditions: | | | | | | | |
| Pressure, p.s.i.g | 500 | 500 | 500 | 500 | 500 | 500 | 500 |
| Hydrogen rate (once through), s.c.f./b | 5,000 | 5,000 | 5,000 | 5,000 | 5,000 | 5,000 | 5,000 |
| S-content of hydrogen, p.p.m | Nil | Nil | Nil | Nil | Nil | Nil | Nil |
| Overall space velocity, v./v./hr | 4.0 | 4.0 | 4.0 | 4.0 | 4.0 | 2.0 | 2.65 |
| Space velocity on Pt-H mordenite | 12.0 | 12.0 | 12.0 | 12.0 | 12.0 | 6.0 | 8.0 |
| Space velocity on Co-Mo-Al₂O₃ | 6.0 | 6.0 | 6.0 | 6.0 | 6.0 | 3.0 | 4.0 |
| Temperature, ° F | 700 | 750 | 725 | 725 | 750 | 750 | 750 |
| Unstabilised product boiling above 177° C.: | | | | | | | |
| Yield, percent wt | 88.6 | 87.5 | 84.4 | 87.1 | 88.4 | 80.4 | 81.6 |
| Pour point, ° F | 20 | 20 | 35 | 35 | 35 | 15 | 30 |
| Sulphur content, percent wt | 0.59 | 0.28 | 0.25 | 0.33 | 0.24 | 0.18 | 0.20 |

The wax content is defined as the amount of material precipitated from methylene chloride solution at —25° F. In this method a known weight of oil is dissolved in hot methylene chloride in a flask, the ratio of methylene chloride to oil being 10:1. The solution of oil in methylene chloride is then cooled to —25° F and held at this temperature for 30 minutes. The precipitated wax is separated by filtration, washed with methylene chloride at 31 25° F until the filtrate is

EXAMPLE 3

The gas oil of Example 2 was used with the catalyst bed of Example 1. The process was started off with once through hydrogen, then switched to unscrubbed recycle hydrogen and eventually back to once through hydrogen again. The conditions used and the results obtained are shown in Table 3 below.

TABLE 3

| | Feed | Hours on stream | | | | | | |
|---|---|---|---|---|---|---|---|---|
| | | 150-310 | 315-330 | 330-370 | 370-390 | 390-470 | 480 | 670 |
| Temperature, °C | | 399 | 399 | 399 | 399 | 399 | 399 | 399 |
| Pressure, p.s.i.g | | 500 | 500 | 500 | 500-1,000 | 1,000 | 1,000 | 1,000 |
| Space velocity over, vol./vol. h | | 12.0 | 12.0 | 12.0 | 12.0 | 12.0 | 12.0 | 12.0 |
| Do | | 6.0 | 6.0 | 6.0 | 6.0 | 6.0 | 6.0 | 6.0 |
| Gas rate—once through, s.c.f./brl | | 5,000 | 5,000 | | | | 5,000 | 5,000 |
| Gas rate—(unscrubbed) recycle, s.c.f./brl | | | | 5,000 | 5,000 | 5,000 | | |
| $H_2S$ content of recycle gas, percent vol | | | | 3.5 | 4.5 | 3.0 | | |
| $H_2$ content of recycle gas, percent vol | | | | 95 | | 96 | | |
| Unstabilised product ($H_2S$ free): | | | | | | | | |
| Yield on feed, percent wt | [100] | 91.5 | | 98.7 | | 98.0 | ca. 95 | ca. 95 |
| Pour point, °C | +7 | (1) | | +7 | | +10 | +7 | +2 |
| Sulphur content, percent wt | 1.91 | (2) | | 0.22 | | 0.1 | 0.08 | 0.08 |
| | | | (3) | | (4) | | (5) | |

[1] −10 to −7.
[2] 0.4 to 0.1.
[3] Switch to recycle over 15 h.
[4] Pressure changed to 1,000 p.s.i.g. over 20 h.
[5] Switch to encep percent through.

After a settling in period, the product over the period 150 to 310 hours on stream showed an improved pour point and reduced sulphur content. When the exit hydrogen with a H S content of 3.5 percent, was recycled, however, the pour point reducing activity was quickly killed, although desulphurisation continued. Increasing the pressure to 1,000 psig effected no improvement and when recycle was stopped and once-through hydrogen used again there was also no significant improvement, showing that the deactivation of the mordenite catalyst was permanent and not temporary.

The same effect would occur if the order of the catalysts were reversed and the $H_2S$ containing products from the desulphurisation allowed to contact the mordenite.

We claim:

1. A hydrocatalytic process for the removal of sulphur and n-paraffin wax from gas oil fractions to render such a fractions suitable for use as diesel fuels or fuel oils comprising passing a petroleum gas oil fraction boiling within the range 250° to 450° C and having a sulphur content of 0.1 to 3.0 percent wt. and a n-paraffin wax content of 5 to 50 percent wt. together with hydrogen which is substantially free of hydrogen sulphide at a temperature of 260°–482° C, at a pressure of 50 – 3,000 psig, and at a space velocity of 2–16 v/v/hr through a first catalyst bed comprising a crystalline mordenite of reduced alkali metal content of less than 3 percent and containing a hydrogenating component therein selected from metals of Groups VI and VIII of the Periodic Table to convert said n-paraffin wax to lower boiling n-paraffins, then passing the total reaction product at a temperature of 260°–482° C, at a pressure of 50 – 3,000 psig, and at a space velocity of 2–16 v/v/hr through a second catalyst bed comprising alumina and a hydrogenating component selected from a Group VI(b) metal and compounds thereof and an iron group metal and compounds thereof of the Periodic Table to remove sulphur, the amount of said wax removal catalyst being 20 to 60 percent volume of the total catalyst and the amount of the sulphur removal catalyst being 80 to 40 percent volume of the total catalyst and separating diesel fuels or fuel oils from the sulphur-removed product.

2. A process as claimed in claim 1 wherein the two catalysts are disposed in the same reactor.

3. A process as claimed in claim 1 wherein the overall space velocity is 2 – 8 v/v/hr and the hydrogen treating rate is 2,000 – 8,000 SCF/B.

4. A process as claimed in claim 1 wherein the n-paraffin wax removal catalyst comprises 0.01 to 10 percent wt of a platinum group metal in said decationized mordenite.

5. A process as claimed in claim 1 wherein the sulphur removal catalyst is an oxide or sulphide of a Group VIb metal, present in 2 – 25 percent wt expressed as metal, and one or more oxides or sulphides of the iron group metals, present in 0.1 to 10 percent wt expressed as metal, supported on alumina.

* * * * *

UNITED STATES PATENT OFFICE
CERTIFICATE OF CORRECTION

Patent No. 3,668,113　　　　　　　　　Dated June 6, 1972

Inventor(s) Bernard Whiting Burbidge et al

It is certified that error appears in the above-identified patent and that said Letters Patent are hereby corrected as shown below:

| | | |
|---|---|---|
| Col. 2, Line 53, for "FIGS." | read | -- Figures -- |
| Col. 3, Lines 1 and 2, for "n-paraffins" | read | -- n-paraffin wax -- |
| Cols. 3 and 4, TABLE 1. Under col. headed 109-213, for "750" | read | -- 725 -- |
| under col. headed 224-272, for "725" | read | -- 750 -- |
| under col. headed 224-272, for "35" | read | -- 20 -- |
| Col. 3, Line 75, for "31 25°F" | read | -- -25°F -- |
| Col. 5, Line 20, for "H S" | read | -- $H_2S$ -- |
| Col. 5, Line 33, for "such a fractions" | read | -- such fractions -- |

Signed and sealed this 9th day of January 1973.

(SEAL)
Attest:

EDWARD M. FLETCHER, JR.　　　　　　　ROBERT GOTTSCHALK
Attesting Officer　　　　　　　　　　　Commissioner of Patents